United States Patent
Hodrus et al.

(10) Patent No.: US 11,098,771 B2
(45) Date of Patent: Aug. 24, 2021

(54) METHOD AND DEVICE FOR DETERMINING THE TRAVEL OF A CLUTCH OR A GEAR ACTUATOR IN A HYDRAULIC CLUTCH ACTUATION SYSTEM OR A HYDRAULIC GEAR ACTUATION SYSTEM

(71) Applicant: Schaeffler Technologies AG & Co. KG, Herzogenaurach (DE)

(72) Inventors: Erhard Hodrus, Achern (DE); Raphael Künzig, Rheinstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/765,062

(22) PCT Filed: Oct. 23, 2018

(86) PCT No.: PCT/DE2018/100863
§ 371 (c)(1),
(2) Date: May 19, 2020

(87) PCT Pub. No.: WO2019/101263
PCT Pub. Date: May 31, 2019

(65) Prior Publication Data
US 2020/0362927 A1 Nov. 19, 2020

(30) Foreign Application Priority Data

Nov. 21, 2017 (DE) .......................... 102017127375.1

(51) Int. Cl.
*F16D 48/02* (2006.01)
*F16D 48/06* (2006.01)

(52) U.S. Cl.
CPC .......... *F16D 48/066* (2013.01); *F16D 48/02* (2013.01); *F16D 2500/1026* (2013.01);
(Continued)

(58) Field of Classification Search
CPC .................. F16D 48/066; F16D 48/02; F16D 2500/1026; F16D 2500/10412;
(Continued)

(56) References Cited

U.S. PATENT DOCUMENTS 5,273,143 A * 12/1993 Voss ...................... F16D 48/066
192/3.58
2004/0210374 A1* 10/2004 Werner ................... F16D 48/06
701/67

(Continued)

FOREIGN PATENT DOCUMENTS

DE 102008024087 A1 11/2009
DE 102012218255 A1 5/2013
(Continued)

*Primary Examiner* — David J Hlavka

(57) ABSTRACT

A method determines the travel of a clutch in a hydraulic clutch-actuation system. A hydraulic signal which extends between a transmitting end and a receiving end is acted upon by an acoustic signal for the generation of a wave packet. The acoustic signal on the transmitting end of the clutch-actuation system is fed into the hydraulic fluid, a wave packet generated by the acoustic signal on the receiving end is reflected back to the transmitting end, a running time of the transmitted and reflected wave packet on the transmitting end is evaluated to determine the coupling travel.

16 Claims, 1 Drawing Sheet

(52) U.S. Cl.
CPC .............. *F16D 2500/10412* (2013.01); *F16D 2500/3024* (2013.01); *F16D 2500/7041* (2013.01)

(58) Field of Classification Search
CPC ..... F16D 2500/3024; F16D 2500/7041; F16D 25/08; F16D 2500/3026; F16D 2500/30803; F16D 2500/3056; F16D 2500/5102; F16D 2500/7103; F16D 2500/1024; F16D 2500/1045; F16D 2500/3166; F16D 2500/50245; F16D 2500/7109; F16D 48/06; F16D 48/00; G01H 3/00
See application file for complete search history.

(56) References Cited

U.S. PATENT DOCUMENTS

2006/0004506 A1\* 1/2006 Stehle .................. B60W 10/02
701/67
2012/0016561 A1\* 1/2012 Pinte .................... F16D 48/066
701/68

FOREIGN PATENT DOCUMENTS

| DE | 102017110165 B3 | 9/2018 |
| WO | 03072970 A1 | 9/2003 |
| WO | 2018206037 A1 | 11/2018 |

\* cited by examiner

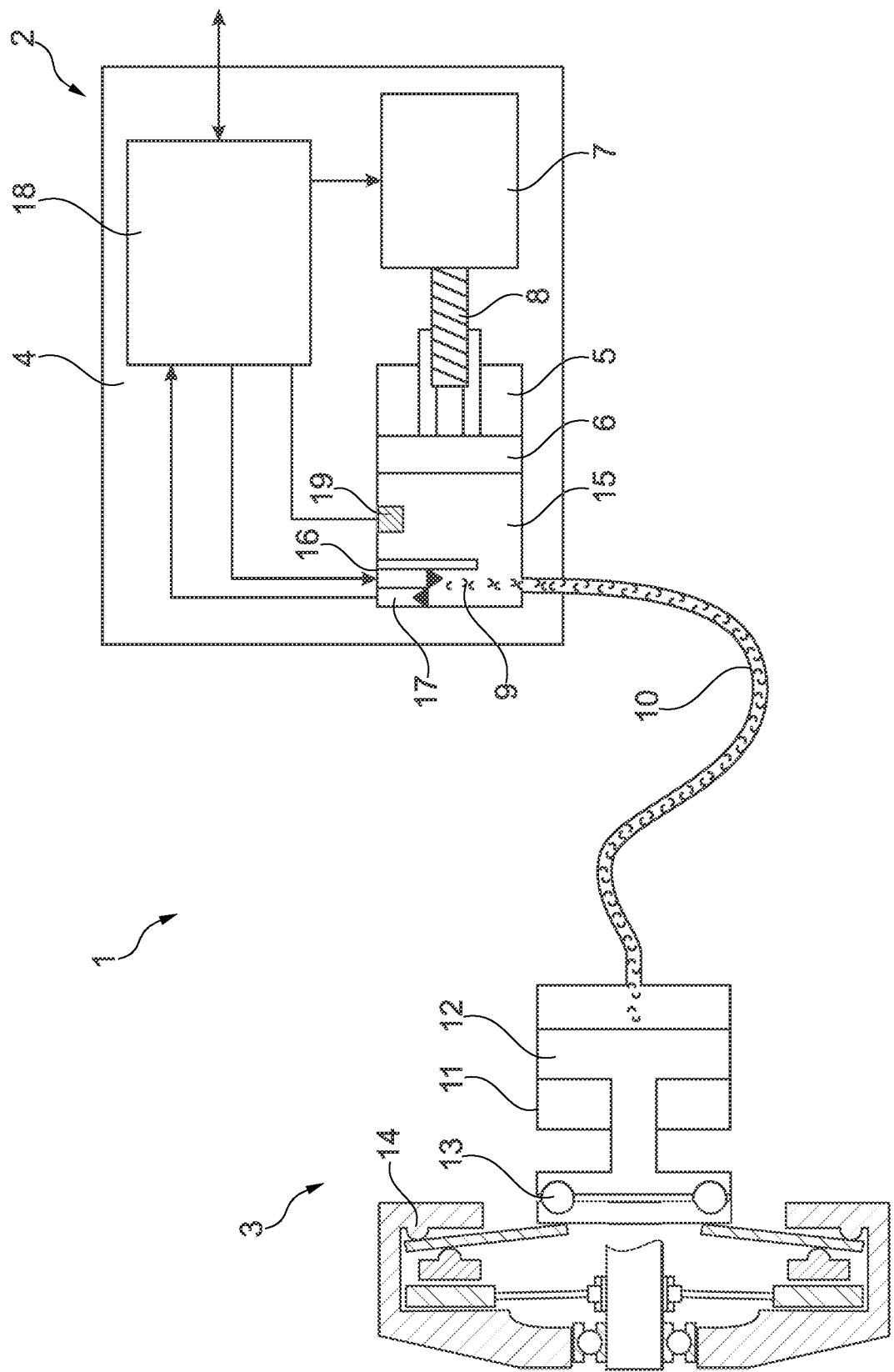

METHOD AND DEVICE FOR DETERMINING THE TRAVEL OF A CLUTCH OR A GEAR ACTUATOR IN A HYDRAULIC CLUTCH ACTUATION SYSTEM OR A HYDRAULIC GEAR ACTUATION SYSTEM

CROSS-REFERENCE TO RELATED APPLICATIONS

This application is the U.S. National Phase of PCT Appln. No. PCT/DE2018/100863 filed Oct. 23, 2018, which claims priority to DE 102017 127 275.1 filed Nov. 21, 2017, the entire disclosures of which are incorporated by reference herein.

TECHNICAL FIELD

The disclosure relates to a method for determining the travel of a clutch in a hydraulic clutch-actuation system, in which a hydraulic fluid extending between a transmitting end and a receiving end is subjected to an acoustic signal, and to a device for carrying out the method.

BACKGROUND

From DE 10 2012 218 255 A1, a method is known for controlling a clutch which has a hydro-static actuator which comprises a gear spindle which is rotated to move a piston of a master cylinder in the axial direction, a travel covered by the piston being determined by at least one sensor unit. For this purpose, a displacement sensor is assigned to the piston to compare the travel actually covered with the determined travel. The travel covered by the piston of the master cylinder can be determined using a pressure sensor or a travel sensor device. The disadvantage here is that the engagement travel of the clutch is determined via the actuator travel, which is an indirect measurement. The position of the actuator is known, so that the release travel of the clutch can be adjusted. However, the hydraulic route is subject to disruptions that can only be partially taken into account by means of computational compensation. These disturbances include thermal effects, which must be leveled out by frequent volume compensation (sniffing) of the hydraulic fluid. However, there is always an uncertainty between the actuator travel reached and the actual disengagement travel of the clutch. In addition, the measurement of the disengagement travel with a classic travel sensor system is very difficult due to the given conditions in the measurement environment due to the lack of installation space and high temperatures. Additional electrical signal and supply lines to the sensor are also necessary.

From the still unpublished German patent application of the applicant with the file number DE 10 2017 110 165.9, a method for controlling a clutch with a clutch-actuation system and a clutch-actuation system are known in which a change in the travel of the clutch detected on the receiving end is converted into an acoustic signal on the receiving end, which is transferred via the hydraulic route to the transmitting end for evaluation. The generation of the acoustic signals on the receiving end is quite complicated and requires additional space in the area of the clutch-actuation system.

SUMMARY

It is desirable to develop a method and a device for determining the travel of a clutch or a gear actuator in a hydraulic clutch-actuation system or a hydraulic gear-actuation system, in which the disengagement travel of the clutch or the gear actuator can be measured simply and reliably with minimal expenditure on equipment.

Such method and device is achieved in that the acoustic signal on the transmitting end of the clutch-actuation system is fed into the hydraulic fluid, a wave packet generated by the acoustic signal being reflected back on the receiving end to the transmitting end, with a running time of the transmitted and reflected wave packet on the transmitting end being evaluated to determine the travel of the clutch. This has the advantage that the travel change is detected directly on the transmitting end, with the suitable sensors and electronics only needing to be provided on the transmitting end for generating and receiving the acoustic signal. This means that no additional installation space is required on the receiving end. Thermal influences such as temperature expansion or soaking effects are prevented. This method also immediately detects a leak in the hydraulic line, an impermissible filling or insufficient ventilation by measuring the clutch disengagement travel directly, thereby preventing safety-critical situations of the clutch-actuation system.

Such method and device is also achieved analogously in that the acoustic signal on the transmitting end of the gear-actuation system is fed into the hydraulic fluid, a wave packet generated by the acoustic signal on the receiving end being reflected back to the transmitting end, with a running time of the transmitted and reflected wave packet being evaluated to determine the travel of the gear actuator.

A density of the hydraulic fluid is advantageously determined to correct the travel measurement. Since the travel, which corresponds to the disengagement travel of the clutch or the gear actuator, is determined over the running time, the speed of sound of the acoustic signal within the hydraulic fluid must also be considered. However, this speed of sound depends on the density of the hydraulic fluid, which is why this is taken into account when determining the running time. The density can be estimated using a pressure sensor or determined using a suitable calculation model, and its effects on the travel measurement can thus be taken into account.

In one design, standing waves are generated from a superimposition of the transmitted and the reflected wave packet to check the plausibility of the travel measurement, the travel of the clutch or of the gear actuator being concluded from a travel between the nodes of the standing waves.

The disengagement travel of the clutch or of the gear actuator is advantageously determined from the difference between the position of a first node of the standing wave and a last node of the standing wave, and is compared with the travel determined from the running time. This ensures that the clutch actuation or the gear-actuator actuation are always based on the correct travel measurements.

The travel determination may be carried out at predetermined time intervals or continuously. Since the vibration excitation of the fluid column of the hydraulic fluid on the transmitting end transmits a microvibration to the moving parts of the clutch-actuation system or the gear-actuation system, which leads to a reduction in friction, it can be disadvantageous, for example, for the self-locking of certain clutch systems or transmission systems so that friction occurs. As a result, it is advantageous if the travel determination method is not carried out in certain situations.

A further development relates to a device for determining the travel of a clutch in a hydraulic clutch-actuation system, comprising an acoustic transmission device for applying an acoustic signal to a hydraulic fluid which extends between a transmitting end and a receiving end of the clutch-actuation system, which acoustic signal is received by an acoustic receiving unit arranged on the transmitting end and is evaluated, with pressure being applied to the hydraulic fluid to actuate the clutch. In a device in which the disengagement travel can be reliably measured using structurally simple means, the acoustic transmitting unit generating an acoustic signal in the hydraulic fluid is arranged on the transmitting end and the acoustic receiving unit receives the signal reflected by the receiving end. The acoustic transmitting or acoustic receiving unit only requires installation space on the transmitting end of the clutch-actuation system, as a result of which the installation space on the receiving end is reduced.

An analogous further development relates to a device for determining the travel of a gear actuator in a hydraulic gear-actuation system, comprising an acoustic transmission device for applying an acoustic signal to a hydraulic signal which extends between a transmitting end and a receiving end of the gear-actuation system, which acoustic signal is received by an acoustic receiving unit arranged on the transmitting end and is evaluated, whereupon the hydraulic fluid for actuating the gear actuator is pressurized. In a device in which the disengagement travel can be reliably measured using structurally simple means, the acoustic transmitting unit generating an acoustic signal in the hydraulic fluid is arranged on the transmitting end and the acoustic receiving unit receives the signal reflected by the receiving end. The acoustic transmitting or acoustic receiving unit only requires installation space on the transmitting end of the gear-actuation system, as a result of which the installation space on the receiving end is reduced.

The acoustic transmitting unit and/or the acoustic receiving unit are advantageously positioned in the clutch actuator or the gear-actuation actuator. They are located very close to the hydraulic system and can therefore reliably transmit or receive their signals to the hydraulic fluid.

In an alternative, the acoustic transmitting unit and/or the acoustic receiving unit are positioned in a master cylinder of the clutch actuator or the gear-actuation actuator. Since the master cylinder comprises a predetermined volume of the hydraulic fluid, the acoustic transmitting unit or the acoustic receiving unit can be easily arranged within the volume of the master cylinder, so that there is no need for additional installation space outside the master cylinder.

The installation space required can be further reduced if the acoustic transmitting unit and the acoustic receiving unit are arranged together in one module. Since only the common module must be sealed off from the hydraulic fluid, the manufacturing costs of the device are reduced.

In one variant, a pressure sensor and a temperature sensor for determining a density of the hydraulic medium are arranged on the transmitting end and connected to an evaluation unit. This makes it easy to calculate the density of the hydraulic fluid used on site and to take it into account when determining the change in the travel of the clutch or the gear actuator.

The pressure sensor advantageously forms a structural unit with the acoustic transmission unit and the acoustic receiving unit. This further reduces the requirements for the installation space.

BRIEF DESCRIPTION OF THE DRAWINGS

An exemplary embodiment will be explained in more detail with reference to the FIGURE shown in the drawing.

The following is shown:
FIGURE: an exemplary embodiment of the device.

DETAILED DESCRIPTION

The FIGURE shows an exemplary embodiment of a device as is used in the clutch-actuation system 1 in a motor vehicle. The clutch-actuation system 1 comprises a transmitting end 2 and a receiving end 3. The transmitting end 2 has a clutch actuator 4, which comprises a master cylinder 5. The master piston 6 arranged in the master cylinder 5 is driven by an electric motor 7, the rotational movement of the electric motor 7 being converted into a linear movement of the master piston 6 of the master cylinder 5 via a threaded spindle 8. The master cylinder 5 is connected via a hydraulic travel 10 filled with a hydraulic fluid 9 to a slave cylinder 11 on the receiving end 3, which has a slave piston 12 which, when the volume of the hydraulic fluid 9 is displaced by the master piston 6 in the hydraulic travel 10, actuates the clutch 14 via a release bearing 13.

An acoustic transmitting unit 16 and an acoustic receiving unit 17 are arranged in a pressure chamber 15 of the master cylinder 5. Both the acoustic transmitting unit 16 and the acoustic receiving unit 17 are connected to an evaluation unit 18 which controls the electric motor 7 or outputs output signals to other motor vehicle modules.

If the electric motor 7 receives a signal from the evaluation unit 18 to open or close the clutch 14, this electrical signal is converted into a movement of the master piston 6, which moves to the left and thereby displaces the volume of the hydraulic fluid 9. As a result of this displaced volume, the slave piston 12 is moved on the slave cylinder 11 and the clutch 14 is thereby adjusted.

To precisely measure the disengagement travel D covered by the clutch 14, the acoustic transmission unit 16, for example a sound sensor, sends an acoustic signal to the hydraulic fluid 9 continuously or at predetermined intervals, resulting in a wave packet which is generated by the hydraulic fluid 9 of the hydraulic fluid line 10 (pressure line) that is moved to the slave cylinder 11 and there is reflected on the slave piston 12. The reflected wave packet is transported back to the master cylinder 5 via the hydraulic travel 10, the reflected acoustic wave packet being detected by the acoustic receiving unit 17. The evaluation unit 18 determines the disengagement travel D, which was covered by the clutch 14, from the running time $\Delta t$ of the transmitted and received reflected wave packet, where the following applies:

$$D = c * \Delta t/2,$$

wherein
D Clutch Disengagement travel
c Speed of Sound
$\Delta t$ Running Time.

Since the speed of sound c depends on the density of the hydraulic fluid 9, the evaluation unit 18 uses a pressure sensor 19, which also projects into the pressure chamber 15 of the master cylinder 5, and a temperature sensor (not shown) to estimate the density. However, the density can also be determined using a suitable calculation model and its effect on the determination of the disengagement travel D can be compensated for.

Due to the necessary line connections of the sensors and the evaluation unit, unwanted reflections that falsify the acoustic signal can arise. In an initialization process, these unwanted reflections or their patterns can be determined before the actual running time determination and can be used to compensate for the reflected wave packet when determining the running time Δt.

Alternatively, a superimposition of the transmitted and reflected wave packets can be used to generate standing waves in the hydraulic fluid 9. The disengagement travel D of the clutch 14 is determined from the position of a first node of the standing wave and the position of a last node. By increasing the frequency, the first fundamental frequency and the subsequent harmonics can be used to perform a plausibility check on the measurement of the disengagement travel D of the clutch 14.

To optimally adjust a standing wave or the reflection, it can be necessary to optimize the hydraulic travel 10 forming the sound travel by introducing additional reflection or guide bodies.

The vibration excitation of the liquid column of the hydraulic fluid 9 by the acoustic transmitting unit 16 enables a transmission of micro vibrations to the moving parts 6, 11 of the clutch-actuation system. Frictions can thereby be reduced, which increases the controllability and regulation capability of the clutch 14. Depending on the operating strategy, the disengagement travel D can be determined continuously or only at certain times. For example, it can be possible that the reduction in friction is sometimes a hindrance to operation, which is the case when predetermined clutch-actuation systems are retained, which is why the travel determination should not be carried out in certain situations.

LIST OF REFERENCE NUMBERS

1 clutch-actuation system
2 Transmitting End
3 Receiving End
4 Clutch Actuator
5 Master Cylinder
6 Master Piston
7 Electrical Motor
8 Threaded Spindle
9 Hydraulic Fluid
10 Hydraulic Track
11 Slave Cylinder
12 Slave Piston
13 Release Bearing
14 Clutch
15 Pressure Chamber
16 Acoustic Transmitting Unit
17 Acoustic Receiving Unit
18 Evaluation Unit
19 Pressure Sensor

The invention claimed is:

1. A method for determining the travel of a slave piston in a hydraulic actuation system, in which a hydraulic fluid extending between a transmitting end and a receiving end is acted upon by an acoustic signal for generating a wave packet such that the acoustic signal on the transmitting end of the actuation system is fed into the hydraulic fluid, a wave packet generated by the acoustic signal on the receiving end is reflected back to the transmitting end, and at the transmitting end a running time of the emitted and reflected wave packet for determining the coupling travel is evaluated.

2. The method according to claim 1, wherein a density of the hydraulic fluid is determined to correct the travel measurement.

3. The method according to claim 1, wherein standing waves are generated from a superimposition of the transmitted and the reflected wave packets to check the plausibility of the travel measurement, the travel of the coupling from a travel between the nodes of the standing wave or the gear actuator being closed.

4. The method according to claim 1, wherein the travel determination is carried out at predetermined time intervals or continuously.

5. A device for determining the travel of a slave piston in a hydraulic actuation system, comprising an acoustic transmitting unit for acting upon a hydraulic fluid which extends between a transmitting end and a receiving end of the actuation system having an acoustic signal which is received by an acoustic receiving unit arranged on the transmitting end, the hydraulic fluid for actuating the clutch being pressurized on the receiving end, wherein the acoustic transmitting unit generating the acoustic signal in the hydraulic fluid is arranged on the transmitting end and the acoustic receiving unit receives the signal reflected by the receiving end.

6. The device according to claim 5, wherein the acoustic transmitting unit and/or the acoustic receiving unit are positioned in a master cylinder.

7. The device according to claim 6, wherein the acoustic transmitting unit and/or the acoustic receiving unit are positioned in a master cylinder of a clutch actuator.

8. The device according to claim 5, wherein the acoustic transmitting unit and the acoustic receiving unit are arranged in a common module.

9. The device according to claim 5, wherein a pressure sensor and a temperature sensor for determining a density of the hydraulic fluid are arranged on the transmitting end.

10. The device according to claim 9, wherein the pressure sensor forms a structural unit with the acoustic transmitting unit and the acoustic receiving unit.

11. The method of claim 1 wherein the hydraulic actuation system is a clutch actuation system.

12. A hydraulic actuation system comprising:
a master cylinder;
a slave cylinder fluidly connected to the master cylinder;
a slave piston axially movable within the slave cylinder;
an acoustic transmitting unit configured to generate an acoustic signal in a fluid;
an acoustic receiving unit configured to detect the acoustic signal after the signals has reflected off the slave piston; and
a processing unit programmed to calculate an axial position of the slave piston with respect to the slave cylinder based on a time delay between generation of the acoustic signal and detection of the reflected acoustic signal.

13. The actuation system of claim 12 wherein the acoustic transmitting unit and the acoustic receiving unit are both located within the master cylinder.

14. The actuation system of claim 12 wherein the processing unit is further programmed to compensate for changes in a density of the fluid.

15. The actuation system of claim 12 further comprising a temperature sensor and a pressure sensor and wherein the processing unit is further programmed to calculate a density of the fluid based on readings from these sensors.

16. The actuation system of claim 12 wherein the slave cylinder is configured to apply or release a clutch.

* * * * *